M. KONTER.
AGRICULTURAL IMPLEMENT.
APPLICATION FILED JULY 1, 1908.
910,927.
Patented Jan. 26, 1909.
3 SHEETS—SHEET 1.
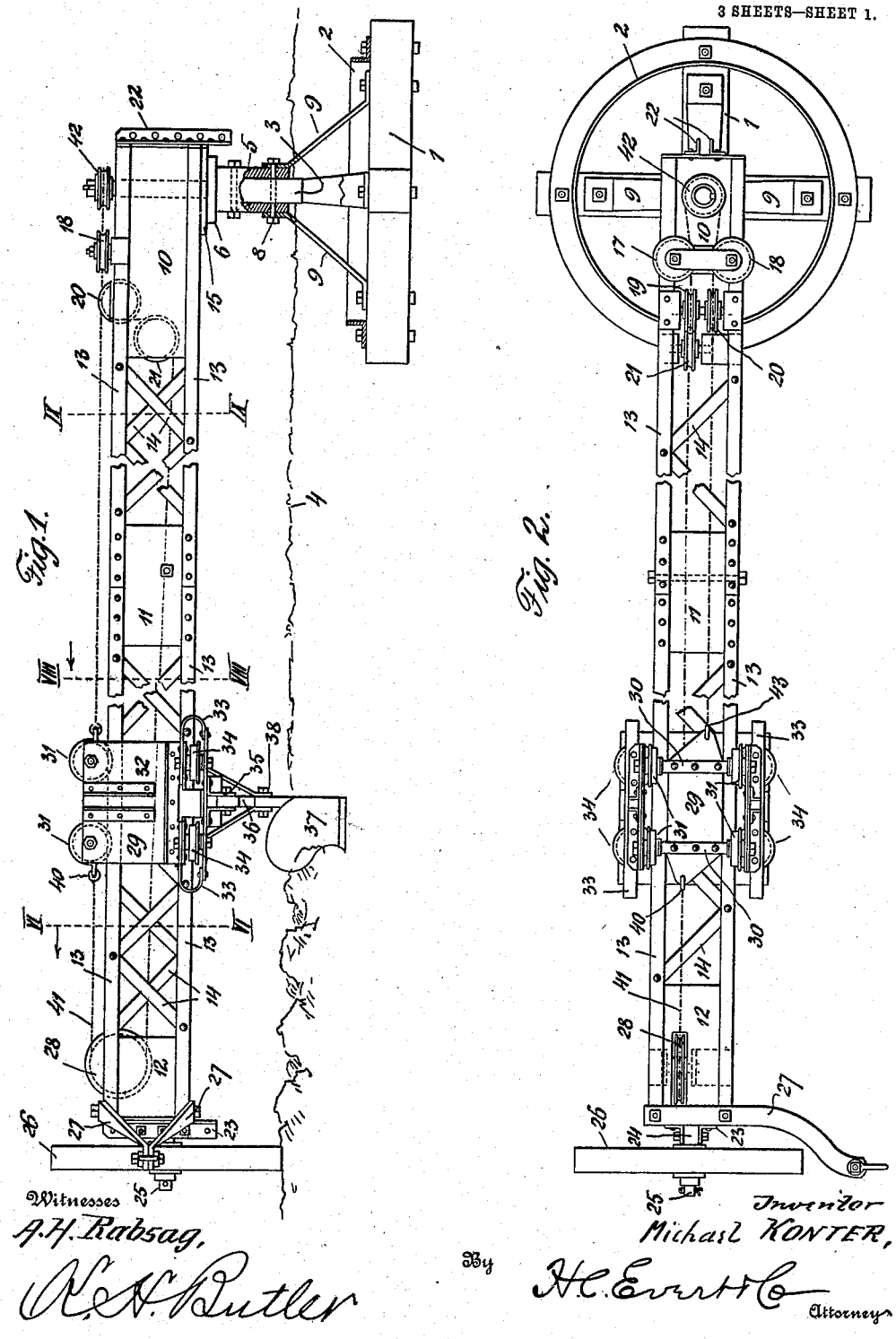

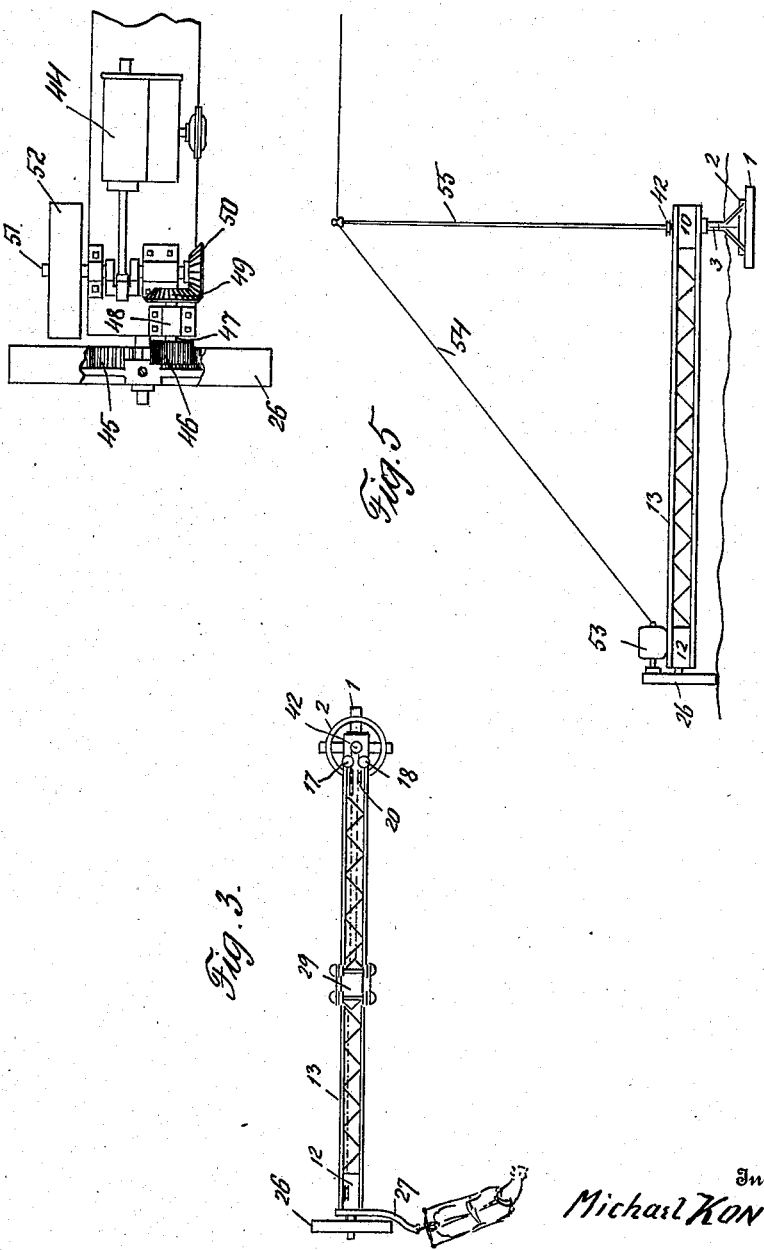

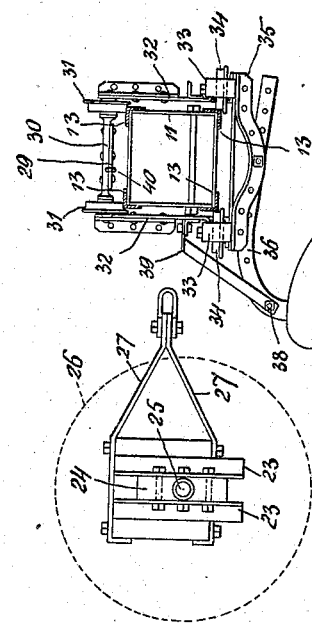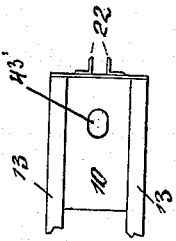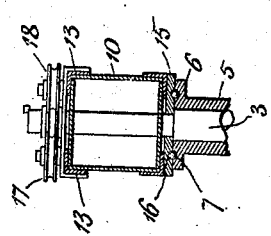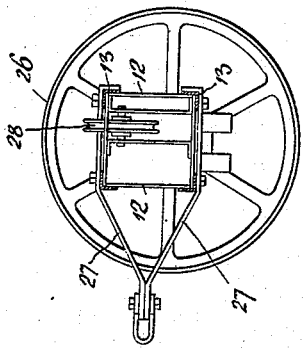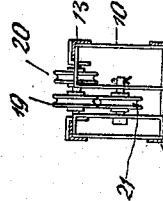

UNITED STATES PATENT OFFICE.

MICHAEL KONTER, OF CORAOPOLIS, PENNSYLVANIA.

AGRICULTURAL IMPLEMENT.

No. 910,927.      Specification of Letters Patent.      Patented Jan. 26, 1909.

Application filed July 1, 1908. Serial No. 441,390.

*To all whom it may concern:*

Be it known that I, MICHAEL KONTER, a citizen of the United States of America, residing at Coraopolis, in the county of Allegheny and State of Pennsylvania, have invented certain new and useful Improvements in Agricultural Implements, of which the following is a specification, reference being had therein to the accompanying drawing.

This invention relates to the propulsion of agricultural implements and the object thereof is to provide means in a manner as hereinafter set forth whereby a plow, cultivator, harrow or other agricultural implement is positively propelled through or over the soil in a circuitous manner from a common point, whereby the soil within a given radius of said point will be thoroughly worked.

The invention further aims to provide means for the propelling of agricultural implements which shall be comparatively simple in its construction and arrangement, strong, driven by a motor, stationary engine, traction engine or drawn by horse power, efficient in its use, conveniently operated and readily set up.

With the foregoing and other objects in view, the invention consists of the novel construction, combination and arrangement of parts hereinafter more specifically described and illustrated in the accompanying drawings, wherein is shown the preferred embodiment of the invention, but it is to be understood that changes, variations and modifications can be resorted to which come within the scope of the claims hereunto appended.

In the drawings, Figure 1 is a side elevation partly broken away and partly in section of a means for propelling an agricultural implement in accordance with this invention. Fig. 2 is a plan with parts broken away. Fig. 3 is a diagrammatic view of the device as operated by horse power. Fig. 4 is a plan of a portion of the device illustrating the driving thereby by an explosive engine. Fig. 5 is a diagrammatic view illustrating the device driven by a motor. Fig. 6 is a cross section on line VI—VI of Fig. 1. Fig. 7 is an end view of the propelling device. Fig. 8 is a section taken on line VIII—VIII of Fig. 1 looking in the direction of the arrow. Fig. 9 is a view similar to that of Fig. 8 taken on line IX—IX of Fig. 1. Fig. 10 is a vertical sectional view of a portion of the device, and, Fig. 11 is a detail in plan.

Referring to the drawings in detail, 1 denotes a base formed of a plurality of timbers which are braced and connected together by a circular angle-bar 2. When the base is set up it is positioned within the soil at a suitable depth and centrally of a field or garden whereby a large area of the field or garden can be covered by the device for propelling the implement.

Centrally of the base 1 is arranged a vertical standard 3 which extends a short distance above the ground 4 and is provided with a sleeve 5 having the upper end thereof flanged as at 6 and formed with an annular ball race 7. The lower end of the sleeve 5 is secured to the standard 3 through the medium of the tie bolts 8, these latter also constitute a means for retaining a series of angular depending braces 9 in engagement with the sleeve 5. The lower ends of said braces 9 are secured to the timbers of the base 1 by suitable hold fast devices.

Swiveled upon the sleeve 5 and having for its pivot the standard 3, is an elongated structural frame adapted to swing in a horizontal plane over the ground 4 surrounding the standard 3, the area covered by said frame depending entirely upon the length of the frame. The frame is formed of structural steel and comprises rectangular boxes 10, 11 and 12, which are secured together by longitudinally extending angle-bars 13 braced by the cross bars 14. The angle-bars 13 are detachably connected to the box 11, this being the intermediate box and by such an arrangement the frame can be lengthened or by interposing sections or the frame can be disassembled for easily handling. The box 10 is the inner box while the box 12 is the outer box. The box 10 is positioned at the inner terminus of the frame, while the box 12 is positioned at the outer terminus. The bottom of the box 10 is provided with a bearing plate 15 having a ball race opposing the race 7 and in the said races are mounted the anti-friction balls 16. Journaled upon the top of the box 10 are the sheaves 17, 18, each of which is mounted upon a vertical axis and extend in parallelism with respect to the upper face of the box. Journaled in the top of the box are the sheaves 19 and 20, each of which is mounted upon a horizontal axis. The said sheaves 19 and 20 are arranged in parallelism with respect to each other. Journaled in the box 10 below the plane of the sheave 19 and forwardly thereof is a sheave 21, the said sheave being mounted upon a horizontal axis. The inner end of the box 10 is provided with vertical angle-bars 22 in which can be journaled a wheel (not shown) so that the frame can be manually moved over the ground when the frame is detached from its pivot.

The outer end of the box 12 has secured thereto vertically extending angle bars 23 between which is mounted an adjustable bearing 24 carrying a stub-shaft 25 for supporting a traction wheel 26 adapted to travel over the ground and further constitute a support for the outer end of the frame, the support for the inner end of the frame being the flanged sleeve 5 which is fixed to the standard 3. Attached to the outer end of the frame are a pair of arms 27 to which can be secured a tongue (not shown). To the tongue can be attached a horse for pulling the outer end of the frame and causing the wheel 26 to travel in a circuitous path with the standard 3 as a center and the frame as the radius of the circle traversed by the wheel 26. In the top of the outer box 12 is arranged a sheave 28 journaled on a horizontal axis.

The angle-bars 13 not only serve as a means for connecting the boxes together, but also constitute rails for the wheels of a carriage or truck which suspends the ground working implement from the frame. The carriage consists of a plate 29 which is arranged above the frame and to which is secured the transversely extending axles 30 carrying flanged wheels 31, these latter traveling upon the upper angle-bars 13. The axles 30 project from the wheels 31 and have connected to the said projecting ends depending reinforced plates 32 having their lower edges provided with bearings 33 in which are journaled guide wheels 34, each of these wheels being journaled on a vertical axis and are adapted to engage the lower bars 13 of the frame. The bearings 33 are connected by a hanger 35 to which is adjustably attached a beam 36 carrying a plow point 37. The beam 36 is pivotally connected as at 38 to a bracket 39 which is carried by one of the depending plates 32. By connecting up the beam in the manner as stated, the angularity of the ground working implement 37 with respect to the ground 4 can be readily adjusted. The plate 29 is provided with an outwardly projecting portion and with an inwardly projecting portion, the ends of these portions extending in different planes and attached to the end of the outwardly projecting portion as at 40 is a cable 41 which passes over the sheave 28, then extends rearwardly towards the pivoted end of the frame, under the sheave 21, upwardly over sheave 19, against sheave 17, then surrounds a sheave 42 keyed upon the standard 3, against the sheave 18, then over sheave 20, then towards the carriage and connected to the end of the rearwardly extending portion of the plate 29 as at 43. To allow of the frame traveling over irregular surfaces without subjecting the standard to stresses, or strains, the box 10 is formed with oval-shaped openings 43' for the standard 3.

In Fig. 4 as illustrated the propelling device is driven by an explosive engine 44. In this connection it will be stated that the wheel 26 is provided with an internal rack 45 which meshes with a pinion 46 mounted upon a shaft journaled in the bearing 48 carried by the outer end of the frame. The shaft 47 is provided with a beveled gear 49 meshing with the beveled gear 50 mounted upon a crank shaft 51 driven by the engine 44. A balance or fly wheel is attached to the crank shaft 51.

In Fig. 5 is illustrated the device as driven by a motor 53. In this connection it will be stated that the motor is located upon the outer end of the frame and is connected by wires 54 to a suitable source of electrical energy, the wires 54 being supported by a trolley pole 55 arranged at the pivot point of the frame. The motor 53 is connected by a suitable transmission to the wheel 26.

The operation of the device is as follows: It will be assumed that the outer end of the frame is drawn by an animal and that the carriage or truck is located at the outer end of the frame. The tension of the cable 41 engaging the sheave 42 is sufficient to gradually move the carriage or truck towards the inner end of the frame, as the frame swings upon the standard 3. As the frame is revolved around the standard, the sheave 42 is also revolved which carries the cable 41, and as the latter is coupled to the ground working implement carriage, the latter is gradually drawn to the standard. As the carriage is gradually drawn to the standard it will be evident that the implement suspended from the carriage will work the ground. The path described by the implement will represent a spiral one having for its starting point the circumference described by the wheel 36 and its finishing point the ground contiguous to the standard 3.

The construction of the carriage or truck prevents the implement carried thereby from lagging or fluctuating from a path other than described by the movement of the frame and the carriage or truck carried thereby.

The anti-friction balls 16 permit of the frame swinging with considerable ease, while the wheels 31 and 34 allow the carriage or truck to easily travel back and forth upon the frame.

What I claim is:

1. A propelling device for agricultural implements comprising a stationary base, a standard carried thereby, a revoluble frame having its inner end swiveled upon said standard, a supporting wheel journaled at the outer end of said frame, a carriage traveling upon said frame from end to end and comprising a plate, wheels supported by the plate and each mounted upon a horizontal axis, said wheels traveling upon the top of the frame, depending plates connected with said first mentioned plate, wheels mounted upon vertical axes and supported from said depending plates and engaging the lower edges of said frame, a bracket carried by one of said depending plates, a hanger arranged below the frame and connected with said depending plates, means connected with the bracket and hanger for suspending a ground working implement, a sheave journaled at the outer end of said frame, sheaves journaled at the inner end of said frame, a sheave mounted upon said standard, and a cable having its ends attached to said first mentioned plate and passing over said sheaves for shifting said carriage back and forth upon said frame during the movement of the latter.

2. A propelling device for agricultural implements comprising a base, a standard carried thereby, a revoluble structural frame pivoted upon said standard, a supporting wheel journaled at the outer end of said frame, a carriage shiftably mounted upon said frame and adapted to travel from end to end thereof, said carriage comprising a plate, wheels revolubly supported by said plate and traveling upon the top of said frame and mounted upon horizontal axes, depending plates connected with said first mentioned plate, wheels revolubly supported from said depending plates and engaging the lower portion of said frame and mounted upon vertical axes, means communicating with said depending plate for suspending the ground working implement below said frame, a sheave journaled at the outer end of the frame, sheaves journaled at the inner end of the frame, a sheave mounted upon said standard, and a cable having its ends attached to said first mentioned plate and passing over said sheaves for shifting said carriage back and forth upon the frame during the movement of the latter.

3. A device of the type described comprising a standard, a frame having its inner end pivoted upon said standard, a supporting wheel arranged at the outer end of said frame, a carriage shiftably mounted upon said frame comprising supporting wheels mounted upon horizontal axes and engaging the top of the frame and further comprising guide wheels mounted upon vertical axes and engaging the sides of the frame, means connected with said carriage for adjustably suspending a ground working implement below the frame, a sheave at one end of said frame, a sheave upon the standard, sheaves at the inner end of the frame, and a cable having its ends connected to said carriage and passing over said sheaves for shifting the carriage back and forth upon the frame during the movement of the latter.

4. A device of the character described comprising a revoluble frame pivoted at one end and embodying an outer, an inner, and an intermediate box and a series of angle-bars secured to the outer and inner box and detachably connected to the intermediate box, a supporting wheel connected to the outer box, a standard extending through the inner box and upon which said frame pivots, a shiftable carriage mounted upon said frame and provided with supporting and guide wheels traveling upon said angle bars, a sheave mounted upon said standard, a sheave journaled in the outer box, a plurality of sheaves journaled in the inner box, and a cable having its ends connected to the carriage and passing from said sheaves for shifting the carriage back and forth upon the frame during the movement of the latter.

In testimony whereof I affix my signature in the presence of two witnesses.

MICHAEL KONTER.

Witnesses:
A. H. RABSING,
MAX H. SROLOVITZ.